United States Patent
Shimomura et al.

(10) Patent No.: US 7,071,683 B2
(45) Date of Patent: Jul. 4, 2006

(54) ROTATION ANGLE SENSING DEVICE HAVING ENLARGED DETECTABLE ANGLE RANGE

(75) Inventors: Osamu Shimomura, Nishio (JP); Tsutomu Nakamura, Kariya (JP); Kenji Tak da, Okazaki (JP); Yoshiyuki Kono, Obu (JP); Takashi Kawashima, Nagoya (JP); Takashi Hamaoka, Kariya (JP)

(73) Assignees: Nippon Soken, Inc. (JP); Denso Corporation (JP)

( * ) Notice: Subject to any disclaimer, the term of this patent is extended or adjusted under 35 U.S.C. 154(b) by 281 days.

(21) Appl. No.: 10/670,214

(22) Filed: Sep. 26, 2003

(65) Prior Publication Data

US 2004/0061495 A1  Apr. 1, 2004

(30) Foreign Application Priority Data

Sep. 30, 2002  (JP) .............................. 2002-285378

(51) Int. Cl.
  *G01B 7/30* (2006.01)
(52) U.S. Cl. .............................. 324/207.25; 324/207.2
(58) Field of Classification Search ............. 324/207.2, 324/207.21, 207.25, 166, 174; 338/32 R, 338/32 H
See application file for complete search history.

(56) References Cited

U.S. PATENT DOCUMENTS

| | | | | |
|---|---|---|---|---|
| 3,891,905 A | * | 6/1975 | Muller | ........................ 318/254 |
| 4,999,531 A | * | 3/1991 | Mavadia et al. | ............... 310/23 |
| 6,130,535 A | * | 10/2000 | Herden et al. | ............ 324/207.2 |
| 6,414,482 B1 | * | 7/2002 | Mase | ....................... 324/207.2 |
| 6,476,600 B1 | | 11/2002 | Kono et al. | |
| 6,501,265 B1 | | 12/2002 | Nakamura et al. | |
| 6,693,424 B1 | * | 2/2004 | Makino et al. | ......... 324/207.25 |
| 2003/0020468 A1 | * | 1/2003 | Kato et al. | ................ 324/207.5 |
| 2004/0251896 A1 | * | 12/2004 | Mizutani et al. | ........ 324/207.25 |

FOREIGN PATENT DOCUMENTS

| | | |
|---|---|---|
| EP | 1 069 400 A1 | 1/2001 |
| EP | 1120626 A | 8/2001 |
| EP | 1143220 A | 10/2001 |
| JP | 2001-004315 | 1/2001 |

OTHER PUBLICATIONS

Properties of Alnico Magnets, www.magnetsales.com/alnico/alprops.htm.*

* cited by examiner

*Primary Examiner*—Jay M. Patidar
(74) *Attorney, Agent, or Firm*—Nixon & Vanderhye PC

(57) ABSTRACT

A rotation angle sensing device for detecting a relative rotation angle between a rotor and a stator includes main magnets, fixed in the rotor, and hole ICs, fixed in the stator. The hole ICs detect magnetic flux of the main magnets, and the relative rotation angle therebetween is detected. A supportive magnet is disposed between the hole ICs so as to offset the magnetic flux of the main magnets. Accordingly, a rotation angle in which the magnetic flux density detected in the hole ICs becomes 0 [mT] can be changed by the supportive magnet. Therefore, a 0° position of the rotation angle can be set to the rotation angle in which the magnetic flux density is detected as 0 [mT], and moreover the detectable range of the rotation angle can be enlarged to be more than 90°.

11 Claims, 5 Drawing Sheets

ROTATION ANGLE SENSING DEVICE HAVING ENLARGED DETECTABLE ANGLE RANGE

CROSS REFERENNCE TO RELATED APPLICATION

This application is based on Japanese Patent Application No. 2002-285378 filed on Sep. 30, 2002, the disclosure of which is incorporated herein by reference.

FIELD OF THE INVENTION

The present invention relates to a rotation angle sensing device for detecting relative rotation angle between two members.

BACKGROUND OF THE INVENTION

A schematic structure of a conventional rotation angle sensing device is shown in FIG. 6. The rotation angle sensing device includes a rotor J3 and a stator J6, each of which is made of magnetic material. The rotor J3 is divided in its diametral direction and has a substantially cylindrical shape. In magnet alignment gaps J1 of the rotor J3, which are positioned in divided parts of the rotor J3, magnets J2 are aligned so that they are magnetized in the same direction. The stator J6 is disposed inside the rotor J3. Moreover, the stator J6 is divided in its diametral direction and has a substantially cylindrical shape. In a magnetic sensing gap J4 of the stator J6, which is positioned in a divided part of the stator J6, magnetic sensing elements J5 (for example, hole ICs) are aligned.

When a relative rotation angle between the magnets J2 and the magnetic sensing elements J5 is changed, density of magnetic flux (magnetic force) flowing through the magnetic sensing element J5 is changed, and thereby output signals of the magnetic sensing elements J5 are changed. That is, the rotation angle sensing device is for detecting the relative rotation angle between the magnets J2 and the magnetic sensing elements J5 on the basis of the output signals of the magnetic sensing elements J5.

Such the rotation angle sensing device is, for example, described in JP-A-2001-317909, JP-A-2001-4315, JP-A-2001-91208 and JP-A-2001-289609. In the rotation angle sensing device, a typical relation between a rotation angle and density of magnetic flux passing through the magnetic sensing elements J5 is shown in FIG. 2A. The magnetic flux density turns back at ±90°. Therefore, detectable range of the rotation angle is between ±90°.

Generally, a permanent magnet is employed as the magnet J2. The permanent magnet has a characteristic that the amount of its generative magnetic flux changes in accordance with temperature. However, in a position where the magnetic flux density is detected as 0[mT], the detected magnetic flux density is the most unchangeable in accordance with the temperature. Therefore, in a position where the magnetic flux density is detected as 0 [mT], the magnetic flux density can be detected with the highest accuracy.

Moreover, when the rotation angle sensing device is used for detecting an opening degree of a throttle valve, a position where the magnetic flux density is detected as 0 [mT] needs to be used as the 0° position of the throttle valve so as to accurately detect a very small opening degree of the throttle valve in an idling state. Accordingly, the detectable range of the rotation angle of the throttle valve is limited between 0° and 90°, and a rotation angle more than 90° can not be detected.

That is, not only employing for the throttle valve, in the conventional rotation angle sensing device, when the 0° position of the rotation angle is set so as to correspond to the position where the magnetic flux density is detected as 0 [mT], it becomes impossible to detect the rotation angle more than 90°.

Moreover, it is considered that an outer device that generates magnetic force, such as a motor, is disposed around the rotation angle sensing device. In this case, by the effect of the outer device, the density of the magnetic flux flowing through the magnetic sensing elements J5 is changed, and thereby the detection accuracy of the rotation angle sensing device is disadvantageously lowered.

That is, the rotation angle sensing device is likely to be influenced by the magnetic force from the outside, and thereby the detection accuracy is likely to be lowered.

SUMMARY OF THE INVENTION

The purpose of the present invention is to provide a rotation angle sensing device, where density of magnetic flux that main magnets apply to magnetic sensing elements is offset to a different value so as to prevent the above problems.

According to the present invention, a rotation angle sensing device includes a rotor, a stator, two magnetic sensing elements and two main magnets. The rotor is made of a magnetic material and has a substantially cylindrical shape. The stator is disposed inside the cylindrical magnetic member. The magnetic sensing elements are fixed to the magnetic member and detect magnetic force. The main magnets are fixed to the cylindrical magnetic member and apply magnetic force to the magnetic sensing elements. A relative rotation angle between the rotor and the stator is detected on the basis of magnetic force detected in the magnetic sensing elements. A supportive magnet is provided so that a rotation angle of the supportive magnet relative to the magnetic sensing element is constant. Moreover, a magnetic concentration gap is formed between the rotor and the stator, and the interval of the magnetic concentration gap becomes smaller in at least one part of the magnetic concentration gap in a predetermined direction.

Accordingly, it has become possible that a basic angle of 0° is offset to where the magnetic flux is about 0 [mT], where the magnetic flux density is not changed in accordance with temperature characteristic, and moreover that detectable angle range is enlarged to be more than 90°.

Moreover, the magnetic concentration gap is formed between the rotor and the stator, and the interval of the magnetic concentration gap becomes smaller in at least one part of the magnetic concentration gap in a predetermined direction. Accordingly, the magnetic flux from the main magnets 4 flows through the stator so as to be concentrated toward the center of the stator. Therefore,the magnetic flux from the main magnet is likely to be biased by the supportive magnet.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PRESENTLY PREFERRED EMBODIMENTS

Figure 1:
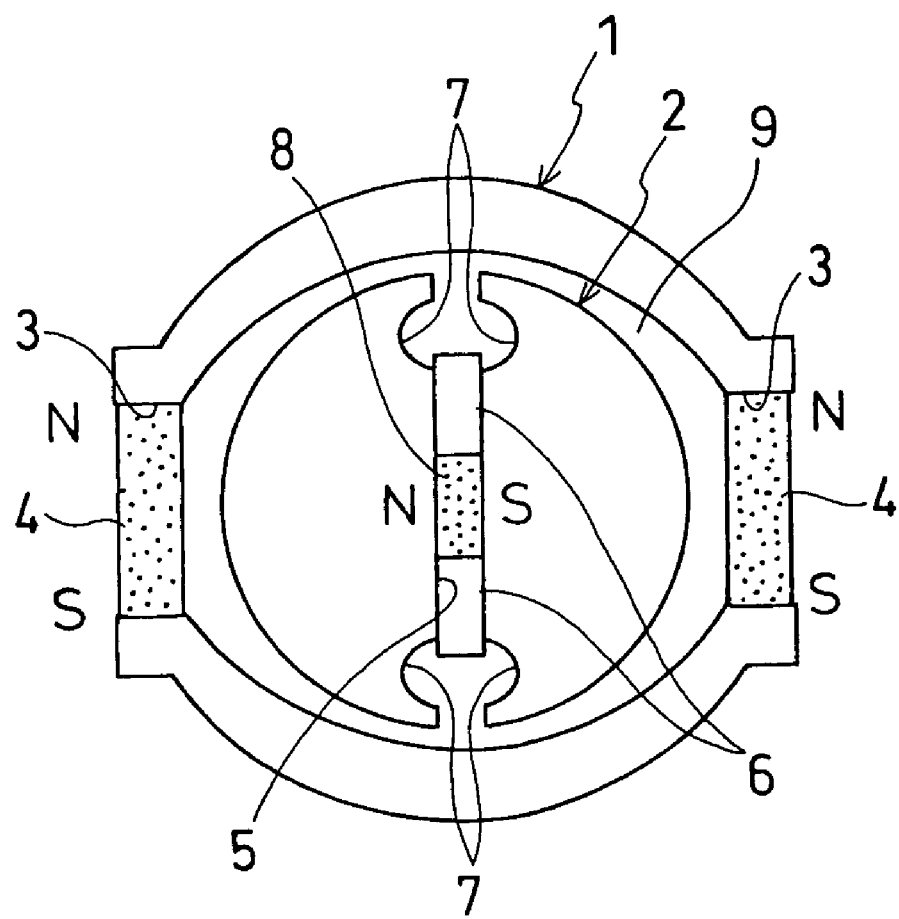
FIG. 1 is a view of a rotation angle sensing device viewed in a direction of its rotation axis according to the first embodiment of the present invention.

Preferred embodiments of the present invention will be described hereinafter with reference to the accompanying drawings.

First Embodiment

At first, a basic structure of a rotation angle sensing device will be described with reference to FIG. 1. The rotation angle sensing device of this embodiment is for detecting an opening degree of, for example, a throttle valve (not shown). The rotation angle sensing device includes a substantially cylindrical rotor 1 (first magnetic member), which rotates integrally with a throttle valve through the other members (not shown), and a stator 2 (second magnetic member), which is disposed inside the rotor 1 and fixed in a non-rotated member (not shown).

The rotor 1 is disposed concentrically with and around the stator 2. There is a clearance between the rotor 1 and the stator 2 so that they should not contact each other. The rotor 1 has a substantially cylindrical shape and is made of magnetic material, such as iron. Moreover, the rotor 1 is divided in its diametral direction, and two main magnets 4, made of permanent magnets, are respectively disposed in magnet alignment gaps 3, which are positioned between divided opposing parts of the rotor 1. The main magnets 4 are magnetized in the same direction. Since such the structure is employed, one of the divided portions of the rotor 1 is magnetized as a north pole, and the other one is magnetized as a south pole.

Moreover, the rotor 1 is formed to have a substantially elliptic shape in its cross-section. A magnetic concentration gap 9 is formed between the rotor 1 and the stator 2. An interval of the magnetic concentration gap 9 becomes smaller from each magnet alignment gap 3 toward a central part of each divided portion of the rotor 1

The stator 2 is made of magnetic material, such as iron, and disposed concentrically with and in the center of the rotor 1. Moreover, the stator 2 is divided in its diametral direction and has a substantially cylindrical shape or a polygonal shape in its cross-section. In a magnetic sensing gap 5, which is formed in a divided part of the stator 2, two hole ICs 6 are fixed. The hole IC 6 is an IC to which a hole element, serving as a magnetic sensing element, and a signal amplifying circuit are integrated. Moreover, the hole IC 6 outputs a voltaic signal corresponding to the density of the magnetic flux passing through the magnetic sensing gap 5, i.e., passing through the hole IC 6.

Moreover, cylindrical large gaps 7 are formed about both sides of the magnetic sensing gap 5 in the stator 2. By virtue of the large gaps 7, magnetic flux passing through the stator 2 flows to be concentrated on the hole ICs 6. Further, since the large gaps 7 are formed to have cylindrical shapes, the larger amount of the magnetic flux applied by the rotor 1 can be flown through the stator 2.

Hereinafter, actions of the rotation angle sensing device employing the above structure, i.e., a structure in which a supportive magnet 8 is not provided, will be explained. Moreover, in this rotation angle sensing device, a rotation angle in an arrangement shown in FIG. 1, where the magnet sensing gap 5 extends perpendicularly to the divided direction of the rotor 1, is defined as 0° position. This rotation angle sensing device forms a magnetic circuit in an arrangement in which the magnet alignment gaps 3 and the magnet sensing gap 5 are positioned in a line, i.e., in a 90° position. In the magnetic circuit, the magnetic flux goes from the north pole of the main magnet 4 through one portion of the rotor 1, one portion of the stator 2, the magnetic sensing gap 5, the other portion of the stator 2 and the other portion of the rotor 1 into the south pole of the main magnet 4 in this order.

In this state, when the rotor 1 rotates with the throttle valve, some of the magnetic flux flows through only one portion of the stator 2. Therefore, the magnetic flux passing through the magnetic sensing gap 5 is reduced.

Figure 2A:
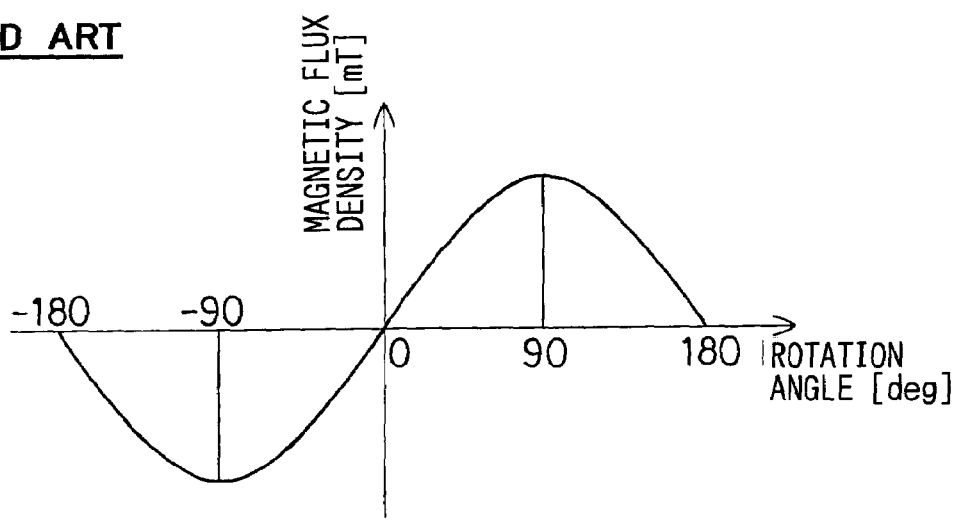
FIGS. 2A and 2B are graphs showing relations between magnetic flux density and a rotation angle.

That is, as shown in FIG. 2A, when the rotation angle of the rotor 1 is 90°, the density of the magnetic flux flowing through the hole ICs 6 is the largest. Moreover, when the rotation angle of the rotor 1 increases to be more than 90° or decreases to be less than 90°, the amount of the magnetic flux passing through the magnetic sensing gap 5 decreases in accordance with the rotation angle, and thereby the density of the magnetic flux passing through the hole ICs 6 decreases.

Moreover, in a position where the rotation angle is 0°, all the magnetic flux flows through only one of the portions of the stator 2 and does not flow through both portions of the stator 2. That is, the magnetic flux does not flow through the magnetic sensing gap 5, and the density of the magnetic flux flowing through the hole ICs 6 becomes 0 [mT].

Moreover, when the rotation angle becomes lower than 0°the amount of the magnetic flux flowing through the magnetic sensing gap 5 in the opposite direction increases in accordance with the rotation angle. Moreover, when the rotation angle of the rotor 1 becomes −90°, the density of the magnetic flux flowing through the hole ICs 6 in the opposite direction becomes the highest.

When the rotation angle becomes lower than −90°, the amount of the magnetic flux flowing through the magnetic sensing gap 5 in the opposite direction is reduced, and the magnetic flux flowing through the hole ICs 6 in the opposite direction is reduced.

As described in a chapter of Prior Art, in the rotation angle sensing device for detecting an opening degree of a throttle valve, a position where the magnetic flux density is detected as 0 [mT] needs to be used as the 0° position of the throttle valve so as to accurately detect a very small opening degree in an idling state.

Accordingly, the detectable range of the rotation angle sensing device is limited in 0–90°, and therefore the rotation angle sensing device can not detect in an angle more than 90°.

Therefore, in the rotation angle sensing device according to this embodiment, a supportive magnet 8 is fixedly disposed closed to the hole ICs 6. The rotation angle of the supportive magnet 8 relative to the hole ICs 6 is fixed. Moreover, the supportive magnet 8 applies a certain amount of magnetic flux to the hole ICs 6, and thereby the magnetic flux density detected in the hole ICs 6 is offset.

Specifically, as shown in FIG. 1, the supportive magnet 8 of this embodiment is fixed in the center of the magnetic sensing gap 5, that is, in the rotation axis between the hole ICs 6. Moreover, the supportive magnet 8 is magnetized in a direction where the magnetic flux passes through the hole ICs 6, i.e., in a direction perpendicular to an extending direction of the magnetic sensing gap 5. The magnetic sensing elements 6 are symmetrical about the magnetization-direction axis of the supportive magnet 8.

The density of the magnetic flux applied to the hole ICs 6 by the supportive magnet 8 is lower than the density of the magnetic flux applied to the hole ICs 6 by the main magnets 4. Therefore, when the density of the magnetic flux applied to the hole ICs 6 by the main magnets 4 becomes 0 [mT] (a state as shown in FIG. 1), the density of the magnetic flux applied to the hole ICs 6 does not become 0 [mT] by virtue of the magnetic force of the supportive magnet 8. Moreover, the density of the magnetic flux applied to the hole ICs 6 becomes 0 [mT] when the hole ICs 6 and the main magnets 4 are relatively rotated by a degree corresponding to the density of the magnetic flux applied to the hole ICs 6 by the supportive magnet 8.

Figure 2B:
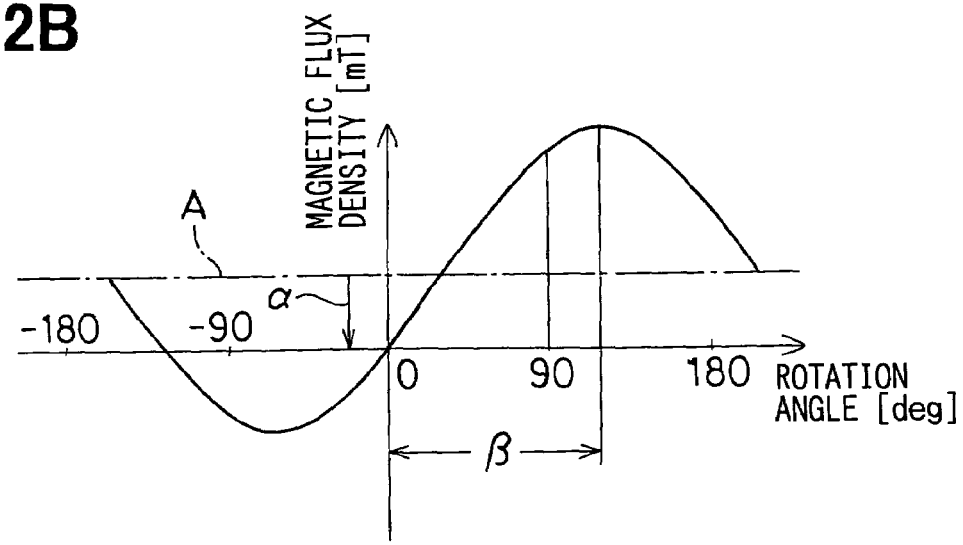

Accordingly, as shown in FIG. 2B, an angle where the density of the magnetic flux detected in the hole ICs 6 becomes 0 [mT] can be changed by the supportive magnet 8. Specifically, in FIG. 2B, when a dashed line A is defined as its transverse axis, FIG. 2B shows a relation between the rotation angle and the magnetic flux density without using the supportive magnet 8. When the supportive magnet 8 is provided, the density of the magnetic flux detected in the hole ICs 6 is offset by an offset degree $\alpha$, and consequently the rotation angle where the magnetic flux density becomes 0 [mT] changes.

Therefore, the 0° position of the throttle valve can be set to a position where the magnetic flux density is detected as 0 [mT] by the hole ICs 6, in which the detected magnetic flux density is not changed in accordance with the temperature characteristic, and moreover a detectable angle range $\beta$ can be enlarged to be more than 90°. Accordingly, the rotation angle sensing device can detect the opening degree of the throttle valve in the rotation angle more than 90°.

In this connection, the main magnet 4 and the supportive magnet 8 are permanent magnets, having the same temperature characteristic. The main magnets 4 and the supportive magnet 8 are magnets made of the same material, for example, a rare-earth magnet, a ferrite magnet or an alnico magnet.

Accordingly, it is prevented that the offset degree $\alpha$ by virtue of the supportive magnet 8 is changed in accordance with the temperature characteristic.

Moreover, since the supportive magnet 8 is disposed in a rotational center of the stator 2, both units of the magnetic flux applied to the two hole ICs 6 can be simultaneously easily offset through the use of one supportive magnet 8.

Moreover, the magnetic concentration gap 9, the interval of which becomes smaller from each magnet alignment gap 3 toward a central part of each divided portion of the rotor 1, is formed. Accordingly, the magnetic flux from the main magnets 4 flows through the stator 2 so as to be concentrated toward the center of the stator 2. Therefore, the magnetic flux from the main magnets 4 is likely to be biased by the supportive magnet 8.

Second Embodiment

Figure 3A:
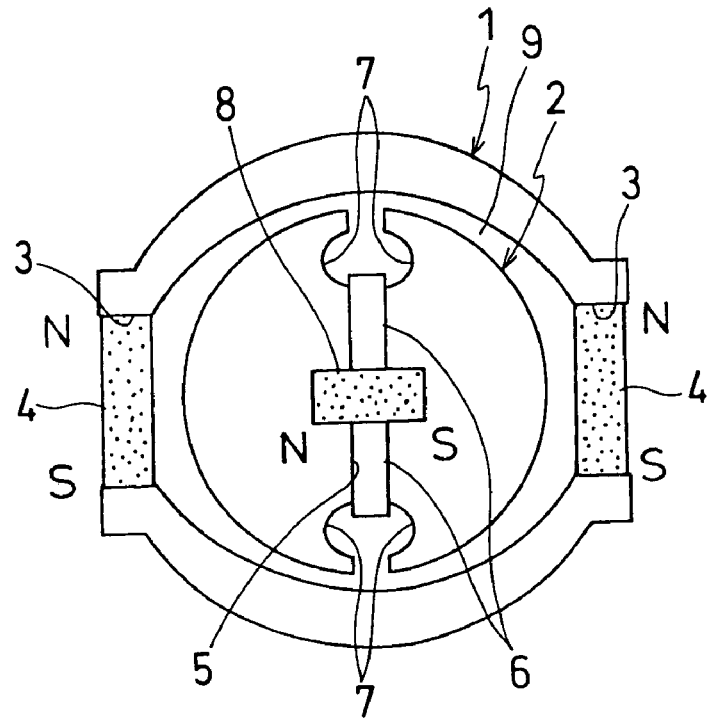
FIG. 3A is a view of a rotation angle sensing device viewed in a direction of its rotation axis according to the second embodiment of the present invention.
Figure 3B:
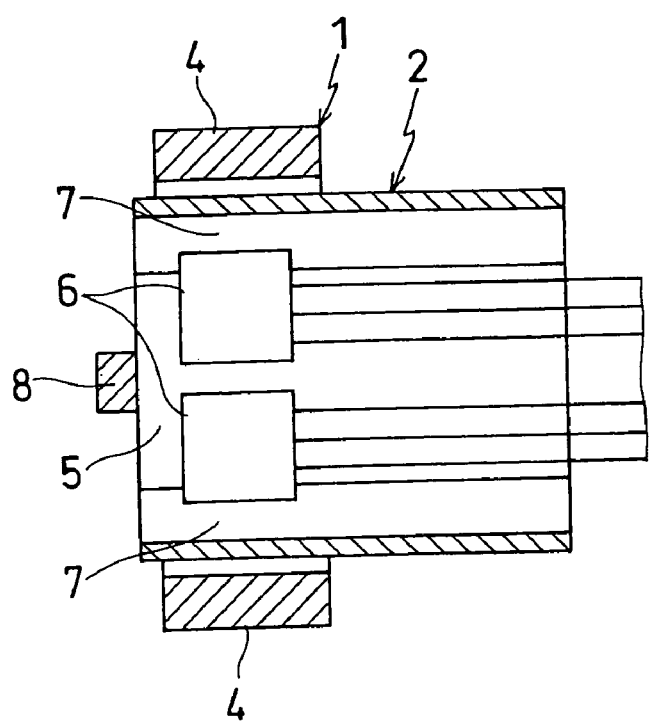
FIG. 3B is a cross-sectional view of the rotation angle sensing device taken along its rotation axis according to the second embodiment of the present invention.

The second embodiment will be explained with reference to FIGS. 3A and 3B. Except for adding a specific explanation, in the second and the latter embodiments, components similar to those described in the first embodiment will be indicated by the similar numerals.

In the first embodiment, the supportive magnet 8 is disposed in the magnetic sensing gap 5 and between the two hole ICs 6. In the second embodiment, the supportive magnet 8 is disposed in a rotational center as well as the first embodiment. However, as shown in FIG. 3B, the supportive magnet 8 is fixed at the axial end of the stator 2 close to the hole ICs 6. The supportive magnet 8 applies a certain amount of magnetic flux to the hole ICs 6 so as to offset the detected magnetic flux density. This rotation angle sensing device can achieve the effect similar to the first embodiment.

Third Embodiment

Figure 4:
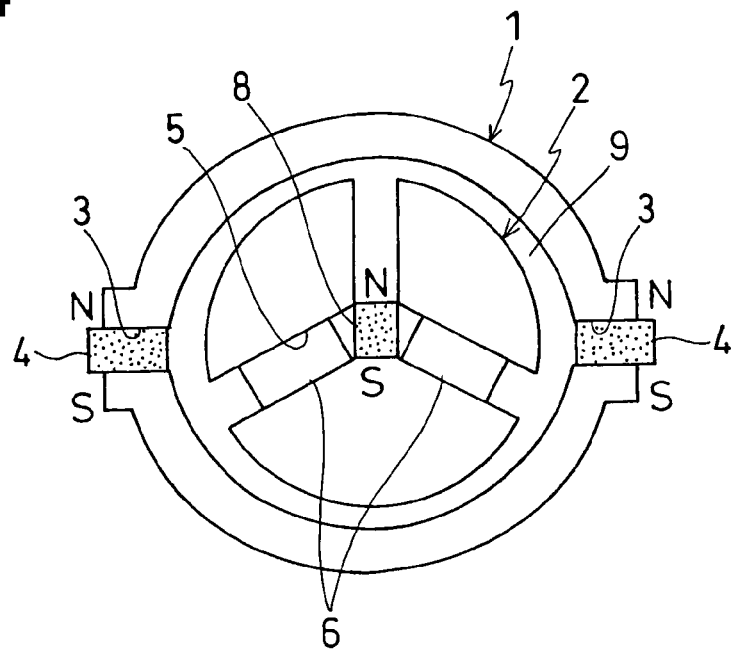
FIG. 4 is a view of a rotation angle sensing device viewed in a direction of its rotation axis according to the third embodiment of the present invention.

The third embodiment will be explained with reference to FIG. 4. In the first and second embodiments, the hole ICs 6 are disposed in the magnetic sensing gap 5 formed between the two divided portions of the stator 2. However, in the third embodiment, the hole ICs 6 are disposed in a magnetic sensing gap 5 formed among three divided portions of the stator 2. In this rotation angle sensing device, the density of the magnetic flux detected in the hole ICs 6 is offset so as to be able to achieve the effect similar to the first embodiment.

Fourth Embodiment

Figure 5:
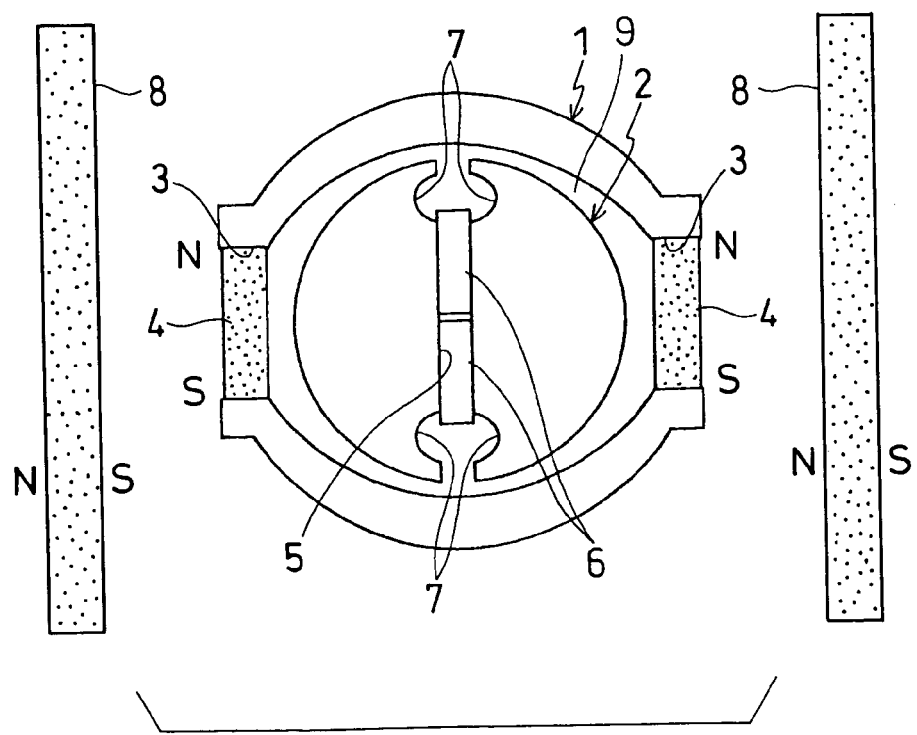
FIG. 5 is a view of a rotation angle sensing device viewed in a direction of its rotation axis according to the fourth embodiment of the present invention.
Figure 6:
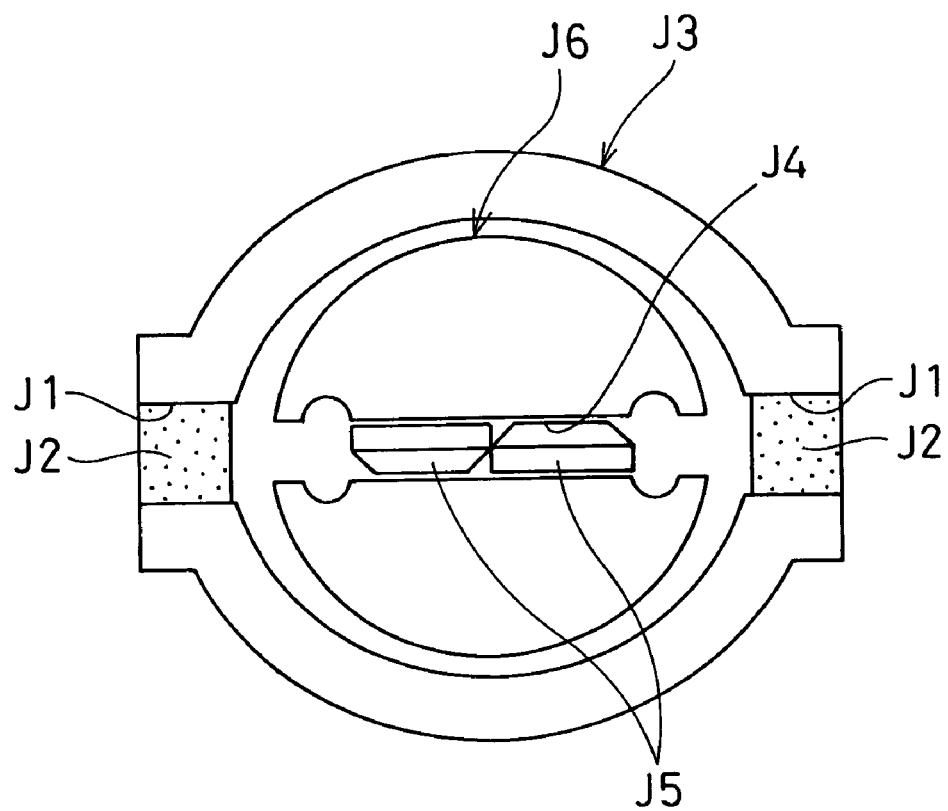
FIG. 6 is a view of a rotation angle sensing device viewed in a direction of its rotation axis according to the related art.

The fourth embodiment will be explained with reference to FIG. 5. In the first to third embodiments, the supportive magnet 8 is disposed closely to the hole ICs 6, and the magnetic force of the supportive magnet 8 is directly applied to the hole ICs 6 so as to offset the density of the magnetic flux detected in the hole ICs 6. However, in the fifth embodiment, two supportive magnets 8 are fixed in a member disposed outside of the rotor 1, for example, a housing (not shown). Moreover, the relative rotation angle between the supportive magnets 8 and the hole ICs 6 is constant. Therefore, the magnetic force of the supportive magnets 8 is applied to the main magnets 4, and thereby the density of the magnetic flux applied to the hole ICs 6 by the main magnets 4 is offset. This rotation angle sensing device can achieve the effect similar to the first embodiment.

(Modifications)

In the above embodiments, a basic rotation angle of 0°, in which the highest detection accuracy is required, is set to correspond to the position where the magnetic flux density is detected as 0 [mT] by the hole ICs 6, and moreover the detectable angle range is enlarged to be more than 90°. However, in a case where the rotation angle sensing device receives magnetic force from the outside, for example, in a case where an outer device that generates the magnetic force, such as a motor, is disposed closely to the rotation angle sensing device, the present invention will be effective. In this case, the supportive magnet 8 should be disposed so as to be able to cancel the effect of the magnetic force from the outside. In this way, it is prevented that the detection accuracy of the rotation angle sensing device is reduced.

In the above described embodiments, the stator 2 is fixed, and the rotor 1 is rotatable. However, it may be all right to employ a structure in which the rotor 1 is fixed and the stator 2 is rotated. That is, in a state where the magnetic sensing elements (the hole ICs 6) are rotated and the main magnets 4 are fixed, the rotation angle may be detected on the basis of outputs of the magnetic sensing elements.

In the above described embodiments, the two magnetic sensing elements (the two hole ICs) are provided. However, one or more than one magnetic sensing elements may be provided. Moreover, it may be all right that only the magnetic sensing elements are disposed in the magnetic sensing gap 5, and the signal amplifying circuit is disposed outside of the stator 2. For example, the signal amplifying circuit may be installed inside a control device.

In the above described embodiments, permanent magnets are employed as the main magnets 4. However, electromagnets may be employed as the main magnets 4. Similarly, an electromagnet may be employed as the supportive magnet 8.

In the above described embodiments, as a specific example of the rotation angle sensing device, the rotation angle sensing device for detecting the opening degree of the throttle valve is explained. However, the rotation angle sensing device may be employed for detecting the rotation angle of the other machine, such as an arm portion of an industrial robot.

The present invention should not be limited to the embodiments previously discussed and shown in the figures, but may be implemented in various ways without departing from the spirit of the invention.

What is claimed is:

1. A rotation angle sensing device comprising:
   a first magnetic member, which is made of a magnetic material and has a substantially cylindrical shape;
   a second magnetic member, which has a substantially cylindrical shape and is disposed inside the first magnetic member;
   the second magnetic member being divided in a diametrical direction thereof into at least two portions which are spaced from each other by a magnetic detection gap;
   at least two magnetic sensing elements, which are disposed in the magnetic detection gap and fixed to the second magnetic member and detect magnetic force; and
   at least one main magnet, which is fixed to the first magnetic member and applies magnetic force to the magnetic sensing elements, the magnetic force being concentrated by the second magnetic member;
   a supportive magnet which is disposed at a radial center portion of the second magnetic member to contact both the two portions of the second magnetic member, the supportive magnet being magnetized in the diametrical direction of the second magnetic member, a rotation angle of the supportive magnet relative to the magnetic sensing element being constant, and the magnetic sensing elements being symmetrical about a magnetization-direction axis of the supportive magnet; and
   a magnetic concentration gap, which is formed between the first magnetic member and the second magnetic member, an interval of the magnetic concentration gap becoming smaller in at least one part of the magnetic concentration gap in a predetermined direction,
   wherein a relative rotation angle between the first magnetic member and the second magnetic member is detected on the basis of magnetic force detected by the magnetic sensing element.

2. The rotation angle sensing device according to claim 1, wherein:
   the first magnetic member is divided in its diametrial direction and includes two magnet alignment gaps formed in divided parts thereof,the the two magnet alignment gaps being respectively provided with the at least one main magnet therein;
   the interval of the magnetic concentration gap becomes smaller from each magnet alignment gap toward a central part of each divided portion of the first magnetic member.

3. The rotation angle sensing device according to claim 1, wherein:
   the magnetic force applied to the magnetic sensing element by the supportive magnet is not zero when the magnetic force applied to the magnetic sensing element by the main magnet only is zero; and
   the magnetic force applied to the magnetic sensing element is zero when the magnetic sensing element and the main magnet are relatively rotated so that changed strength of the magnetic force applied to the magnetic sensing element corresponds to strength of the magnetic flux applied to the magnetic sensing element by the supportive magnet.

4. The rotation angle sensing device according to claim 1, wherein maximum strength of the magnetic force applied to the magnetic sensing element by the main magnet is stronger than strength of the magnetic force applied to the magnetic sensing element by the supportive magnet.

5. The rotation angle sensing device according to claim 1, wherein the main magnet and the supportive magnet are permanent magnets having the same temperature characteristic.

6. The rotation angle sensing device according to claim 1, wherein the supportive magnet is disposed closely to the magnetic sensing element.

7. The rotation angle sensing device according to claim 1, wherein the supportive magnet applies magnetic force to the main magnet.

8. The rotation angle sensing device according to claim 1, wherein the supportive magnet forms magnetic field that is symmetrical with respect to a relative rotation axis between the magnetic sensing element and the main magnet.

9. The rotation angle sensing device according to claim 1, wherein the supportive magnet is disposed on an axial end of the second magnetic member.

10. A rotation angle sensing device comprising:
    at least two magnetic sensing elements;
    at least one main magnet, which applies magnetic force to the magnetic sensing elements;
    a second magnetic member which has a substantially cylindrical shape to concentrate the magnetic force,
    the second magnetic member being divided in a diametrical direction thereof into at least two portions which are spaced from each other by a magnetic detection gap; and
    a supportive magnet, which is arranged in the magnetic detection gap and disposed at a radial center portion of the second magnetic member, the supportive magnet being magnetized in the diametrical direction of the second magnetic member, wherein:
    the magnetic sensing elements are disposed in the magnetic detection gap and symmetrical about a magnetization-direction axis of the supportive magnet;
    a rotation angle of the supportive magnet relative to the magnetic sensing element is constant; and
    a relative rotation angle between the magnetic sensing element and the main magnet is detected on the basis of magnetic force detected by the magnetic sensing element.

11. The rotation angle sensing device according to claim 10, further comprising
a first magnetic member, which is made of a magnetic material and has a substantially cylindrical shape, wherein:
the main magnet is fixed to the first magnetic member;
the second magnetic member is disposed inside the first magnetic member and spaced from the first magnetic member by a magnetic concentration gap, which becomes narrow in at least one part thereof in a predetermined direction; and
the supportive magnet contacts all said portions of the second magnetic member.

* * * * *

UNITED STATES PATENT AND TRADEMARK OFFICE
CERTIFICATE OF CORRECTION

PATENT NO. : 7,071,683 B2  Page 1 of 1
APPLICATION NO. : 10/670214
DATED : July 4, 2006
INVENTOR(S) : Shimomura et al.

It is certified that error appears in the above-identified patent and that said Letters Patent is hereby corrected as shown below:

On the Title Page;

"(75) Inventors: Osamu Shimomura (Nishio, JP);
Tsutomu Tsutomu (Kariya, JP);
Kenji Tak da (Okazaki, JP);
Yoshiyuki Kono (Obu, JP);
Takashi Kawashima (Nagoya, JP);
Takashi Hamaoka (Kariya, JP)"

should be

--(75) Inventors: Osamu Shimomura (Nishio, JP);
Tsutomu Tsutomu (Kariya, JP);
Kenji Takeda (Okazaki, JP);
Yoshiyuki Kono (Obu, JP);
Takashi Kawashima (Nagoya, JP);
Takashi Hamaoka (Kariya, JP)--.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,071, 683 B2
APPLICATION NO. : 10/670214
DATED : July 4, 2006
INVENTOR(S) : Shimomura et al.

Page 1 of 1

It is certified that error appears in the above-identified patent and that said Letters Patent is hereby corrected as shown below:

On the Title Page;

"(75) Inventors: Osamu Shimomura (Nishio, JP);
Tsutomu Nakamura (Kariya, JP);
Kenji Tak da (Okazaki, JP);
Yoshiyuki Kono (Obu, JP);
Takashi Kawashima (Nagoya, JP);
Takashi Hamaoka (Kariya, JP)"

should be

--(75) Inventors: Osamu Shimomura (Nishio, JP);
Tsutomu Nakamura (Kariya, JP);
Kenji Takeda (Okazaki, JP);
Yoshiyuki Kono (Obu, JP);
Takashi Kawashima (Nagoya, JP);
Takashi Hamaoka (Kariya, JP)--.

Signed and Sealed this

Twenty-second Day of May, 2007

JON W. DUDAS
*Director of the United States Patent and Trademark Office*